(12) United States Patent
Anderson

(10) Patent No.: US 10,909,842 B2
(45) Date of Patent: Feb. 2, 2021

(54) USE OF SELF-DRIVING VEHICLES AND MAPPING FOR PEDESTRIAN DEFINED CROSSWALKS

(71) Applicant: Intel Corporation, Santa Clara, CA (US)

(72) Inventor: G. Nowel Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/017,808

(22) Filed: Jun. 25, 2018

(65) Prior Publication Data

US 2019/0051150 A1   Feb. 14, 2019

(51) Int. Cl.
| | |
|---|---|
| *G08G 1/005* | (2006.01) |
| *G08G 1/07* | (2006.01) |
| *H04W 4/44* | (2018.01) |
| *G08G 1/16* | (2006.01) |
| *G08G 1/09* | (2006.01) |
| *H04W 4/024* | (2018.01) |

(52) U.S. Cl.
CPC ............... *G08G 1/005* (2013.01); *G08G 1/07* (2013.01); *G08G 1/091* (2013.01); *G08G 1/166* (2013.01); *H04W 4/44* (2018.02); *H04W 4/024* (2018.02)

(58) Field of Classification Search
CPC ........ G08G 1/005; G08G 1/091; G08G 1/166; G08G 1/07; H04W 4/44; H04W 4/024
See application file for complete search history.

(56) References Cited

U.S. PATENT DOCUMENTS

| | | | | |
|---|---|---|---|---|
| 9,672,732 | B1* | 6/2017 | Aladas | ................... G08C 17/02 |
| 10,121,368 | B1* | 11/2018 | Aladas | ...................... G08G 1/07 |
| 2015/0228195 | A1* | 8/2015 | Beaurepaire | ............. B60Q 1/50 |
| | | | | 340/907 |
| 2017/0227964 | A1* | 8/2017 | Lehtiniemi | .............. G08G 1/00 |

OTHER PUBLICATIONS

Umbrellium website as retrieved from the Internet: <URL: https://umbrellium.co.uk/products/starling-cv/>.

* cited by examiner

*Primary Examiner* — James J Yang
(74) *Attorney, Agent, or Firm* — Spectrum IP Law Group LLC

(57) ABSTRACT

An apparatus to generate a user-defined crosswalk comprises a processor to receive an input from a user to request a crosswalk across a roadway at a selected location and a memory coupled to the processor to store information regarding the crosswalk. The processor is to transmit the request to one or more vehicles using the roadway, and to receive a response indicating whether the crosswalk request is accepted such that the one or more vehicles are to stop to allow the user to cross the roadway using the crosswalk at the selected location in the event the crosswalk request is accepted.

14 Claims, 10 Drawing Sheets

USE OF SELF-DRIVING VEHICLES AND MAPPING FOR PEDESTRIAN DEFINED CROSSWALKS

FIELD

The present disclosure generally relates to the field of electronics. More particularly, an embodiment relates to self-driving vehicles and systems.

BACKGROUND

Solutions to smart crosswalks have been proposed, for example, the Starling Crossing that reacts dynamically in real-time to different conditions and is able to modify the patterns, layout, configuration, size, and orientation of pedestrian crossings in order to prioritize pedestrian safety. Alphabet's Sidewalk Labs aims to design and create a model smart city which would involve smart crosswalks. These solutions, however, do not allow a pedestrian to define their own crosswalks and still rely on human drivers to stop for pedestrians, thereby increasing the chances of an accident.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Figure 1:
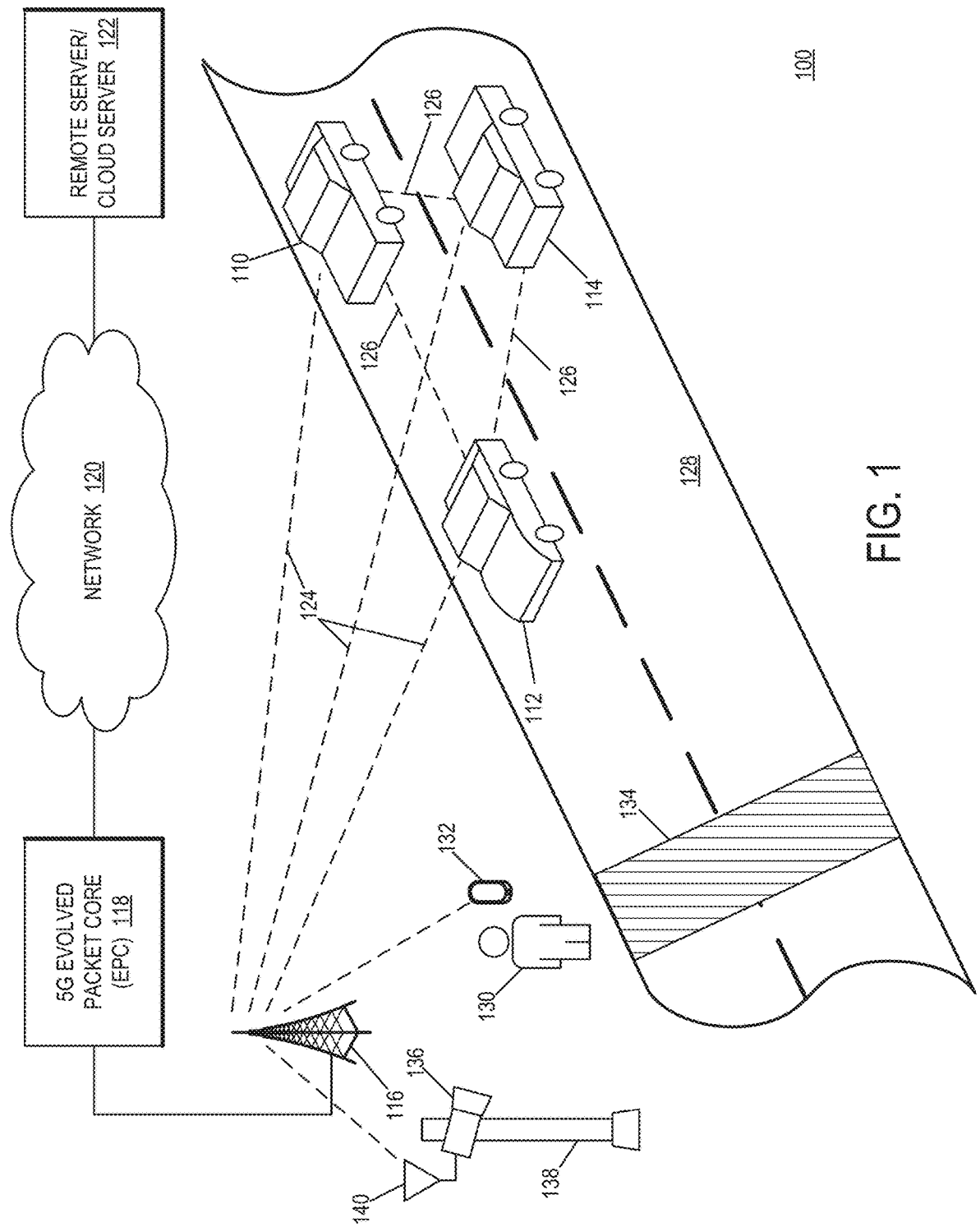
FIG. 1 is a diagram of an environment in which a pedestrian defined crosswalk may be deployed in accordance with one or more embodiments.

Referring now to FIG. 1, a diagram of an environment in which a pedestrian defined crosswalk may be deployed in accordance with one or more embodiments will be discussed. In environment 100, pedestrian 130 may desire to define his or her own crosswalk 134 across roadway 128 at a location where a crosswalk may not exist. In some embodiments, pedestrian 130 may use a smartphone 132 or similar device such as a smartwatch, tablet, personal computer, or other computing device, to create a pedestrian defined crosswalk 134 at a desired location across roadway, for example using a mapping application running on smartphone 132. The smartphone 132 may be in communication with an evolved Node B (eNB) 116 of a Long-Term Evolution (LTE) cellular network, or a Fifth Generation (5G) Node B (gNB) of a 5G cellular network, and so on. The eNB 116 (or gNB) may be coupled to an evolved packet core (EPC) 118, which may be a 5G EPC, of the cellular network and may couple to another network 120 such as the Internet to couple the smartphone 132 to a remote server or cloud server 122.

One or more automobiles or cars such as car 110, car 112, and/or car 114 may be driving on roadway 128. Although three cars are shown in FIG. 1 for purposes of discussion, environment 100 may include any number of cars, N number of cars, and the scope of the claimed subject matter is not limited in this respect. One or more of the cars may include a self-driving system or driver assist system coupled to one or more sensors to obtain data to be processed for decision making, for example to implement autonomous driving or driver assistance for the cars while being operated on the roadway 128. In some embodiments of environment 100, the cars may report their status directly to each other, for example via network 126 or through the cellular network via wireless links 124. In such an arrangement, one or more of the cars may be coupled with eNB 116 of the cellular network operating in accordance with a Third Generation Partnership Project (3GPP) standard. In such embodiments, eNB 116 or gNB may be part of the EPC 118 that may operate in accordance with a 5G New Radio standard wherein one or more of the cars may operate as a user equipment (UE) device, although the scope of the claimed subject matter is not limited in this respect.

Thus, the cars of environment 100 may be in communication with one another for data transfer via eNB 116 of a 5G based EPC 118. EPC 118 in turn may be coupled to a network 120 such as the Internet to allow one or more of the cars to couple to a remote server 122 or cloud server to facilitate coordination of data collated from one or more cars to assist with or provide decision making facilities for the one or more cars, or for example to implement or to provide updates to the algorithms running on the decision-making systems in one or more of the cars based on crowdsourced or machine learning techniques, although the scope of the claimed subject matter is not limited in these respects. For example, remote server 122 may provide additional processing power to a decision-making process, and further may use various algorithms such as machine learning or deep learning to the decision-making process for any one or more of the cars, individually or collectively, and the scope of the claimed subject matter is not limited in these respects. The processing results of remote server 122 may then be transmitted back to the one or cars via the radio links of EPC 118 provided by eNB 116. In one or more embodiments, the radio links with EPC 118 via eNB 116 may be utilized, for example, to transmit the sensor data of one or more cars or other agents to one or more other agents to facilitate the decision-making process of a given vehicle or agent.

In some embodiments, one or more of the cars may communicate directly with one or more other cars in proximity to each other. For example, a mesh network 126 or similar network or connection such as a wireless local area network (WLAN) or PC5 connection in accordance with a Third Generation Partnership Project (3GPP) standard may be established between two or more adjacent cars or other agents, for example using any suitable radio technology such as wireless communication in compliance with an Institute of Electrical and Electronics Engineers (IEEE) 802.11x standard or the like, or using proximity-based services (ProSe) sidelink in accordance with a Third Generation Partnership Project (3GPP) standards using a PC5 interface between one or more cars or other agents, although the scope of the claimed subject matter is not limited in these respects. In one or more embodiments, such a mesh network 126 or sidelink may be utilized, for example, to transmit the sensor data of one or more cars or other agents to one or more other agents to facilitate the decision-making process of a given vehicle or agent. Such a mesh network 126 or sidelink may be used alone or in combination with the radio link to EPC 118 via eNB 116, although the scope of the claimed subject matter is not limited in this respect.

As will be discussed in further detail below, pedestrian 130 may submit a request to generate the pedestrian defined crosswalk 134 so that the pedestrian 130 may cross roadway 128 at a desired location. One or more of the cars may receive the request, and if implemented, the cars may automatically stop at or proximate to the location of the crosswalk 134, for example where the cars are self-driving vehicles or are being operated in a self-driving mode. Alternatively, if the cars are operating with a driver-assist system, the drivers of the cars may be alerted or notified to stop at or proximate to the location of the crosswalk 134. In another embodiment, instead of generating a pedestrian defined crosswalk 134 with a smartphone 132, other devices in environment 100 may detect the presence of the pedestrian near roadway 128, and such devices may then communicate the request for the crosswalk 134 to the cars so that the cars may stop at or near the location of the crosswalk 134. In such other embodiments, the devices may include a camera 136 or other sensors which may be mounted on a light pole 138, post, or similar structure, and which may include its own radio and antenna 140 to communicate with eNB 116 to communicate with the cars. Alternatively, the radio and antenna 140 of such devices may communicate directly with the cars, for example via mesh network 126, and the scope of the claimed subject matter is not limited in these respects.

In one or more embodiments, the mapping application running on the smartphone 132 of the pedestrian 130 may allow the pedestrian 130 to define a crosswalk 134 at some point on roadway 128. Defining a crosswalk 134 may be accomplished in a variety of ways such as tracing the crosswalk on the smartphone 132 with a stylus or finger, by selecting two points on a map, or using the current position of the pedestrian 130 to determine an optimal location for the crosswalk 134. After the pedestrian 130 submits the crosswalk 134 with the mapping application, one or more self-driving vehicles that would encounter this crosswalk 134 may be notified. Alternative methods of defining the crosswalk 134 also may be used such as gesture, eye tracking, and/or or voice activation.

The self-driving vehicles may send feedback to the smartphone 132 suggesting an alternative location to crosswalk 134, for example at a location that is more optimal for traffic and/or safety of the pedestrian 130. The self-driving vehicles may provide additional information such as an estimate as to how long the pedestrian 130 must wait before the crosswalk 134 is available. The self-driving vehicles will then decide when to stop for the pedestrian 130 which may involve determining the location of other self-driving vehicles in the area and coordinating a time optimal for traffic. The self-driving vehicles then may block traffic at the determined location of the crosswalk 134 to allow one or more pedestrians 130 to cross roadway 128 safely.

Since the self-driving vehicles already may have the ability to communicate with one or more other self-driving vehicles in a certain vicinity, establishing a connection between the smartphone 132 and any nearby self-driving cars may be sufficient to inform one or more nearby self-driving vehicles of the proposed crosswalk 134. A connection could also be established between the smartphone 132 and a local or external system such as server 122 via eNB 116 (or gNB) and EPC 118. Such local or external systems may coordinate with the nearby self-driving vehicles. Alternatively, the smartphone 132 may communicate with an external system other than the self-driving vehicles which is capable of monitoring and/or directing self-driving traffic.

Figure 2:
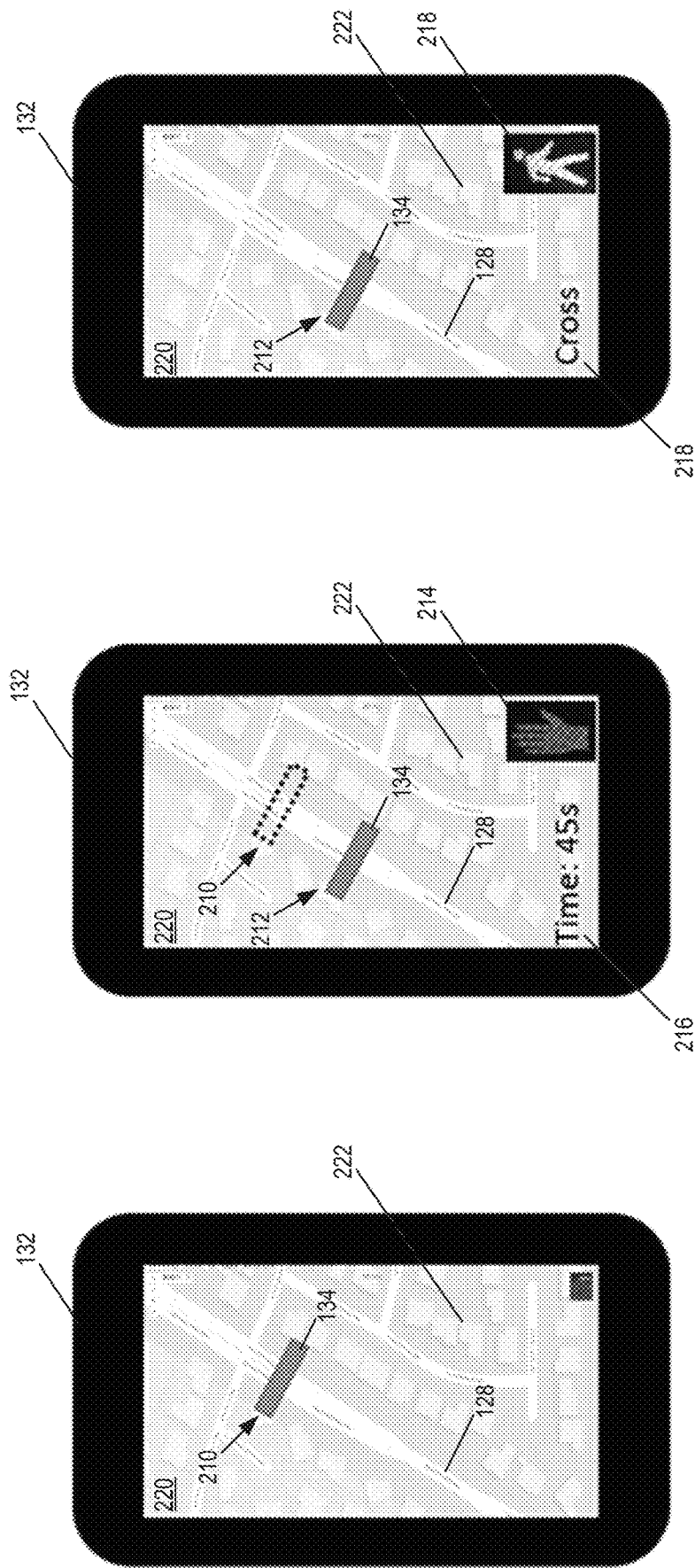
FIG. 2 is a diagram of an application running on a smartphone or similar device to generate a pedestrian defined crosswalk in accordance with one or more embodiments.

Referring now to FIG. 2, a diagram of an application running on a smartphone or similar device to generate a pedestrian defined crosswalk in accordance with one or more embodiments will be discussed. The smartphone 132 of pedestrian 130 may be running a mapping program which may display a map 220 of the streets in the vicinity of the pedestrian 130 on the display of the smartphone 132. For example, the map 220 may include a portion of the roadway 128 in the vicinity of pedestrian 130. The pedestrian 130 as the user of the smartphone 132 may define and submit a desired crosswalk to the mapping program 134 across roadway 128 on the map 220 at location 210. Alternatively, the mapping program may automatically generate a proposed crosswalk 134 at a location 210 as determined by the mapping program, for example based on the direction in which the pedestrian is headed, the present location of the pedestrian, the programmed destination of the pedestrian 130, or the destination of the pedestrian 130 as estimated from the mapping program, and so on, or a combination thereof.

The mapping program of smartphone 132 may then transmit the proposed crosswalk 134 at location 210 to one or more vehicles in the area, or alternatively to a server 122 that may make crosswalk decisions. Based at least in part on the expected traffic, geographical features, topology, legal permissions, or legal prohibitions, and so on, the one or more cars and/or the server 122 may determine whether or not the pedestrian 130 should be allowed to cross at a crosswalk 134 defined at location 210. If the proposed crosswalk 134 is acceptable, the cars may be automatically self-stopped, the server 122 may cause the cars to stop by issuing a command to the cars, or the users of the cars may be provided with information indicating the cars should be stopped by their drivers, at location 210 so that the pedestrian 130 may cross roadway 128 via the crosswalk 134. In some embodiments, such decisions may be performed wholly, or at least in part in conjunction with one or more other devices such as the cars and/or server 122, by the mapping program running or some hardware or other application running on the smartphone 132.

If a better time and/or location is determined for the crosswalk 134, a time estimate 216 and/or new location 212 may be determined and provided for when and where the pedestrian 130 may cross roadway 128. For example, the time estimate and/or new location 212 may be proposed by the decision-making device or software. As a result, the pedestrian 130 is given a time estimate 216 and an indication 214 to not cross at the originally proposed crosswalk 134 at location 210. The pedestrian 130 may then decline or accept the proposal, for example automatically with the mapping program or manually via input to the smartphone 132. When the pedestrian 130 accepts the time estimate and/or new location 212, the cars may be automatically self-stopped, the server 122 may cause the cars to stop by issuing a command to the cars, or the users of the cars may be provided with information indicating the cars should be stopped by their drivers, at new location 212 so that the pedestrian 130 may cross roadway 128 via the crosswalk 134. An indication 218 may be provided on the display of the smartphone 218 indication that the pedestrian 130 may cross roadway 128 at the new location 212 of the crosswalk 134.

In one or more embodiments, a proposed crosswalk 134 may be generated using the smartphone 132 via any one or more of a variety of input modalities such as air or touch gestures, voice input, face and eye tracking, and so on. Similarly, outputs, feedback, or other indicators to the pedestrian 130 regarding the mapping program, the estimate time and/or new location 212, and other indicators may be generated by smartphone 312 using a variety of output modalities such as a projection, the display screen, sound generating devices and/or speakers, and/or haptic output. The pedestrian 130 as the user of the smartphone may define a proposed crosswalk 134 in a variety of ways for mapping application, for example drawing a crosswalk 134 on the display of the smartphone 132, selecting two points on the display of the smartphone 132, selecting a spot on the roadway 128, and so on. In some embodiments, the pedestrian 130 may define a proposed crosswalk 134 using a hand gesture, eye movement, voice commands, and so on, that are detectable by one or more appropriate sensors of the smartphone 132.

In one or more embodiments, a context engine running on the smartphone 132 and/or on server 122 may be utilized to determine likely decisions of the pedestrian 130 in a given situation, for example to automatically generate a proposed crosswalk 132. Machine learning may be used to enhance the accuracy of identifying likely crosswalks 134 and managing traffic on roadway 134 in the vicinity of the crosswalk 134. Multiple pedestrians may share a single crosswalk or multiple defined crosswalks to minimize impact to traffic on roadway and/or to coordinate a crosswalk 134 that may be used by several pedestrians 130 simultaneously. Furthermore, one or more pedestrians 130 may define one or more crosswalks 134 at the same time or nearly the same time. One or more crosswalks 134 may be defined to plan a complete route, and the mapping application may predict when pedestrians 130 will arrive at each of the proposed crosswalks along the route and have self-driving vehicles stop accordingly. In addition, the pedestrian may be provided with multiple alternative options for crosswalks 134 along a given route and/or at a given area so that pedestrian 130 may select one of the multiple crosswalks 134 based on estimated time and distance. One or more self-driving vehicles or cars may be notified of the crosswalk 134 in a variety of ways including an external connection to the application on the smartphone 132 via the wireless links 124 to eNB 116 via the cellular network, vehicle-to-vehicle communication such as mesh network 126, and/or local sensors in the cars or along the roadway 128. It should be note that although a pedestrian 130 is discussed for purposes of example, the user may also be bike rider, motorcyclist, a stroller, a cart rider, a rider of a scooter or a skateboard, a driver of another vehicle, and so on, and the scope of the claimed subject matter is not limited in this respect.

Figure 3:
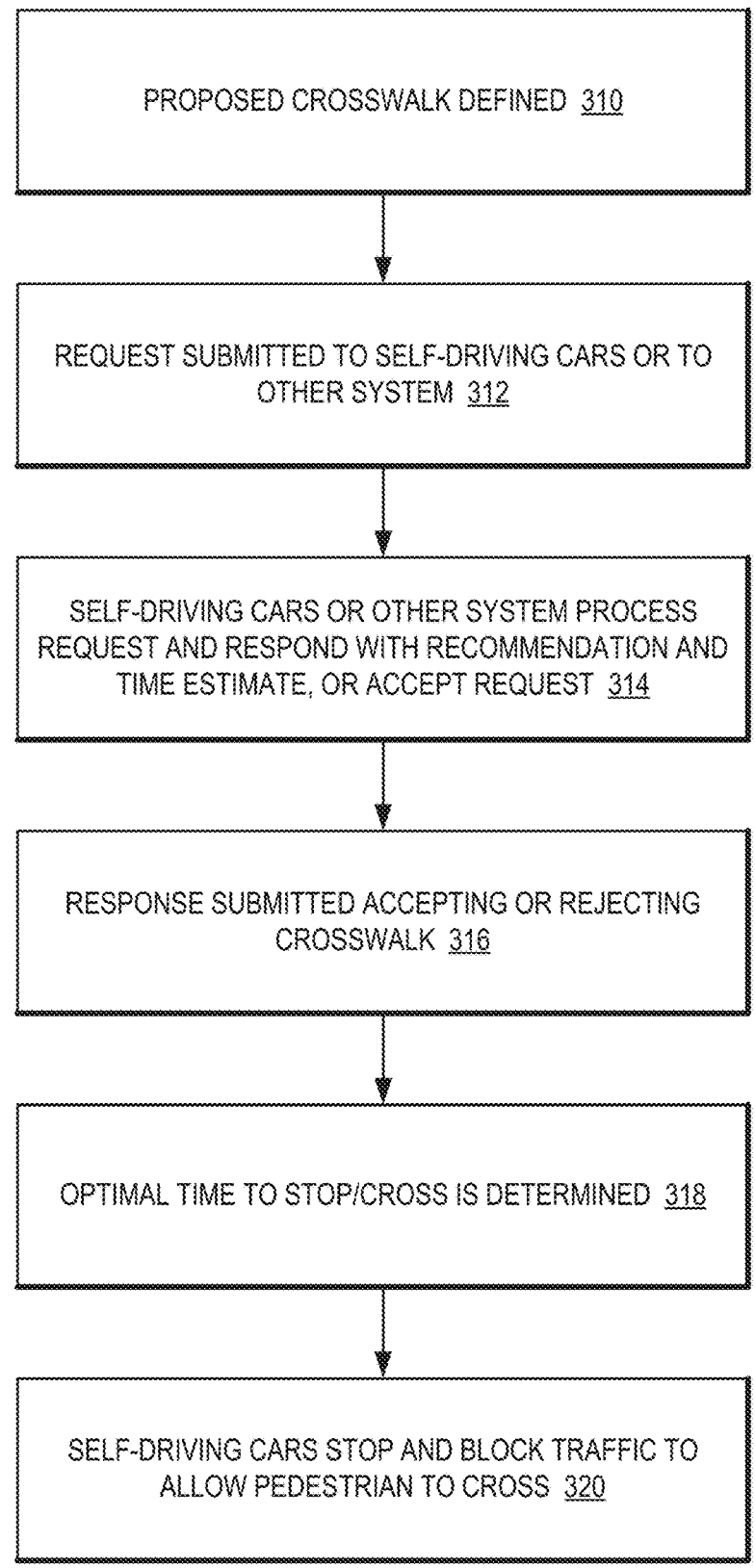
FIG. 3 is a flow diagram of a method to generate a pedestrian defined crosswalk in accordance with one or more embodiments.

Referring now to FIG. 3, a flow diagram of a method to generate a pedestrian defined crosswalk in accordance with one or more embodiments will be discussed. Method 300 may include fewer or more operations than shown, and/or in various other orders, and the scope of the claimed subject matter is not limited in these respects. A proposed crosswalk 134 may be defined at operation 310, for example wherein a pedestrian 130 draws a proposed crosswalk 134 on a mapping application running on a smartphone 132. A request for the crosswalk 134 may then be submitted at operation 312 to one or more self-driving cars on roadway 128 and/or to one or more other external systems such as a remote server or cloud server 122. The self-driving cars or other external systems may then process the request submitted by the pedestrian 130 and may respond at operation 314 with an acceptance message to smartphone 132 or alternatively with one or more or recommendations for an alternative location for the crosswalk 134 optionally including a time estimate for when the originally proposed crosswalk 134 or the alternatively recommended crosswalks 134 may be available. At operation 316 the pedestrian 130 or smartphone 132 may submit a response accepting the originally proposed crosswalk 134 or an alternatively proposed crosswalk 134. An optimal time to stop the one or more vehicles and/or for the pedestrian 130 to cross at the crosswalk 134 may determined at operation 318. The one or more self-driving cars or driver-assisted vehicles may then stop at the accepted location of the crosswalk 134 at operation 320, optionally blocking traffic, to allow the pedestrian 130 to cross the roadway 128 at the crosswalk 134 at the selected time.

Figure 4:
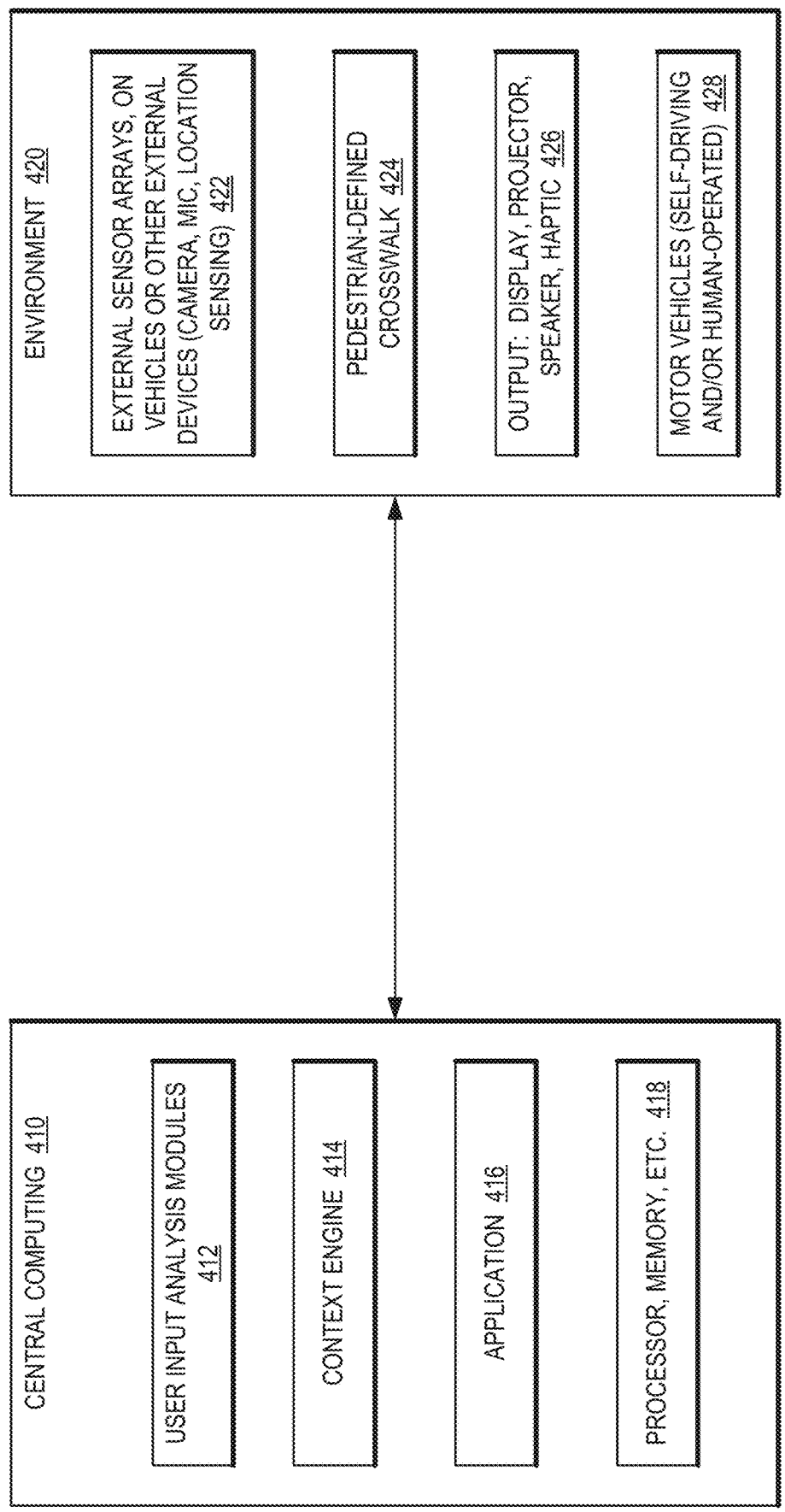
FIG. 4 is a diagram of a computing system to generate a pedestrian defined sidewalk in an environment in accordance with one or more embodiments.

Referring now to FIG. 4, a diagram of a computing system to generate a pedestrian defined sidewalk in an environment in accordance with one or more embodiments will be discussed. The system 400 of FIG. 4 may implement the method 300 of FIG. 3 in whole or in part, and/or may include more or fewer elements than shown, and the scope of the claimed subject matter is not limited in these respects. A central computing device or platform 410 may be utilized to implement smartphone 132 and/or remote server or cloud server 122, and/or one or more computing platforms of a self-driving car or driver-assisted vehicle. The central computing platform 410 may include one or more user input analysis modules 412, a context engine 414, and an application 416 to run on one or more processors and memory 418 of the central computing device or platform 410. The modules of the central computing device or platform 410 may be cloud-based such as cloud server 122, edge server based, or end-user based, and so on, and the scope of the claimed subject matter is not limited in this respect.

The environment 420 in which the pedestrian 130 may be traveling near roadway 128 may include one or more external sensor arrays 420, on one or more self-driving vehicles or driver-assisted vehicles, or other external devices such as one or more cameras 136, one or more microphones, one or more location sensing devices and so on. The environment 420 also may include a pedestrian defined crosswalk 424 to represent crosswalk 134 across roadway 128. The environment 420 also may include an output device 426 for example a display, projector, one or more speakers, one or more haptic devices, and so on, for example provided in smartphone, on pole 138, on roadway 128, in one or more of the cars, and so on. The environment 420 also may include one or more motor vehicles 428 such as one or more self-driving cars and/or one or more human-operated cars that may or may not include a driver-assist system.

Figure 5:
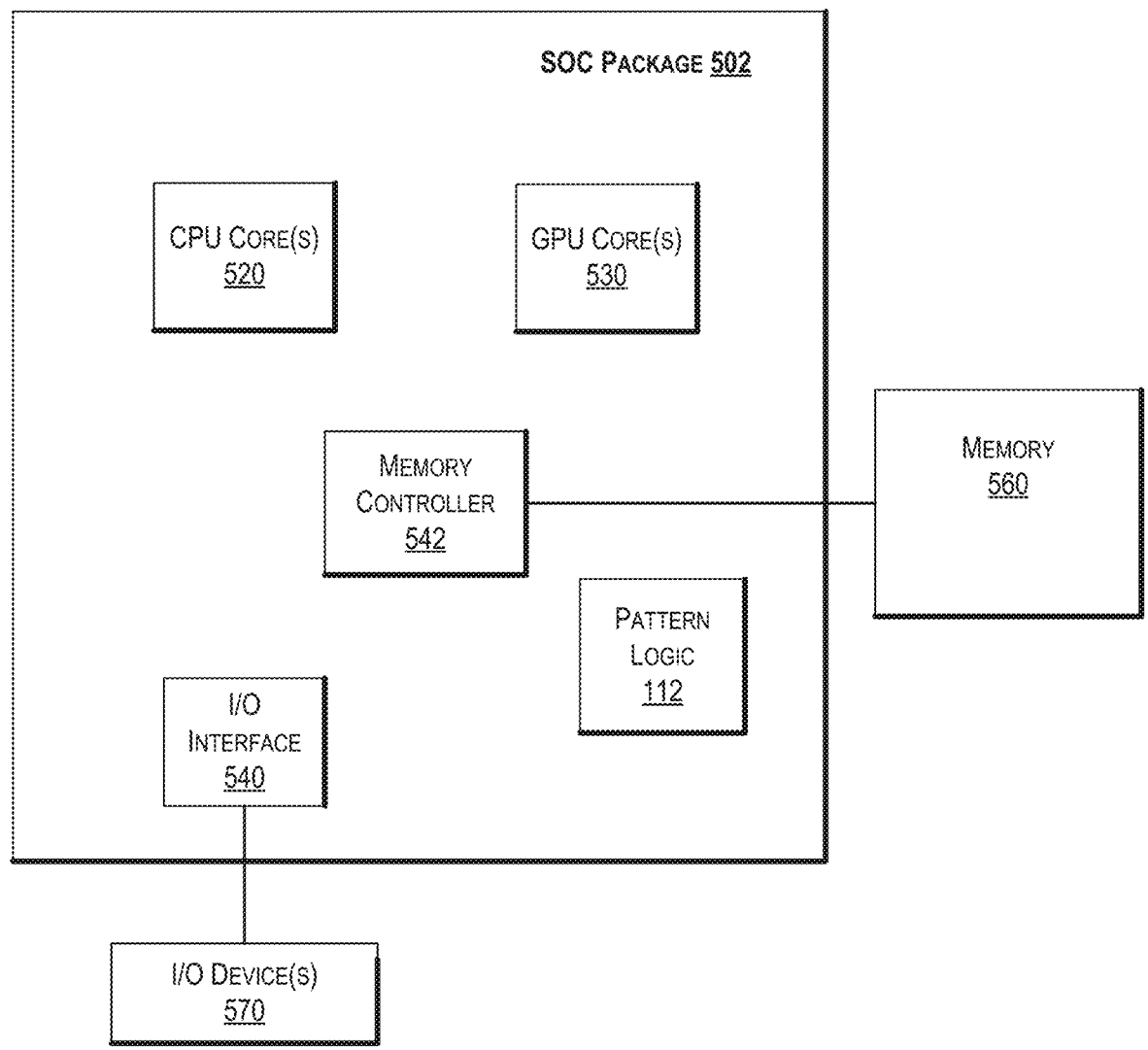
FIG. 5 illustrates a block diagram of a system on chip (SOC) package in accordance with an embodiment.

FIG. 5 illustrates a block diagram of a system on chip (SOC) package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 660 (or a portion of it) can be integrated on the SOC package 502.

The I/O interface 540 may be coupled to one or more I/O devices 570, e.g., via an interconnect and/or bus such as discussed herein with reference to other figures. I/O device (s) 570 may include one or more of a keyboard, a mouse, a touchpad, a display, an image/video capture device (such as a camera or camcorder/video recorder), a touch screen, a speaker, or the like.

Figure 6:
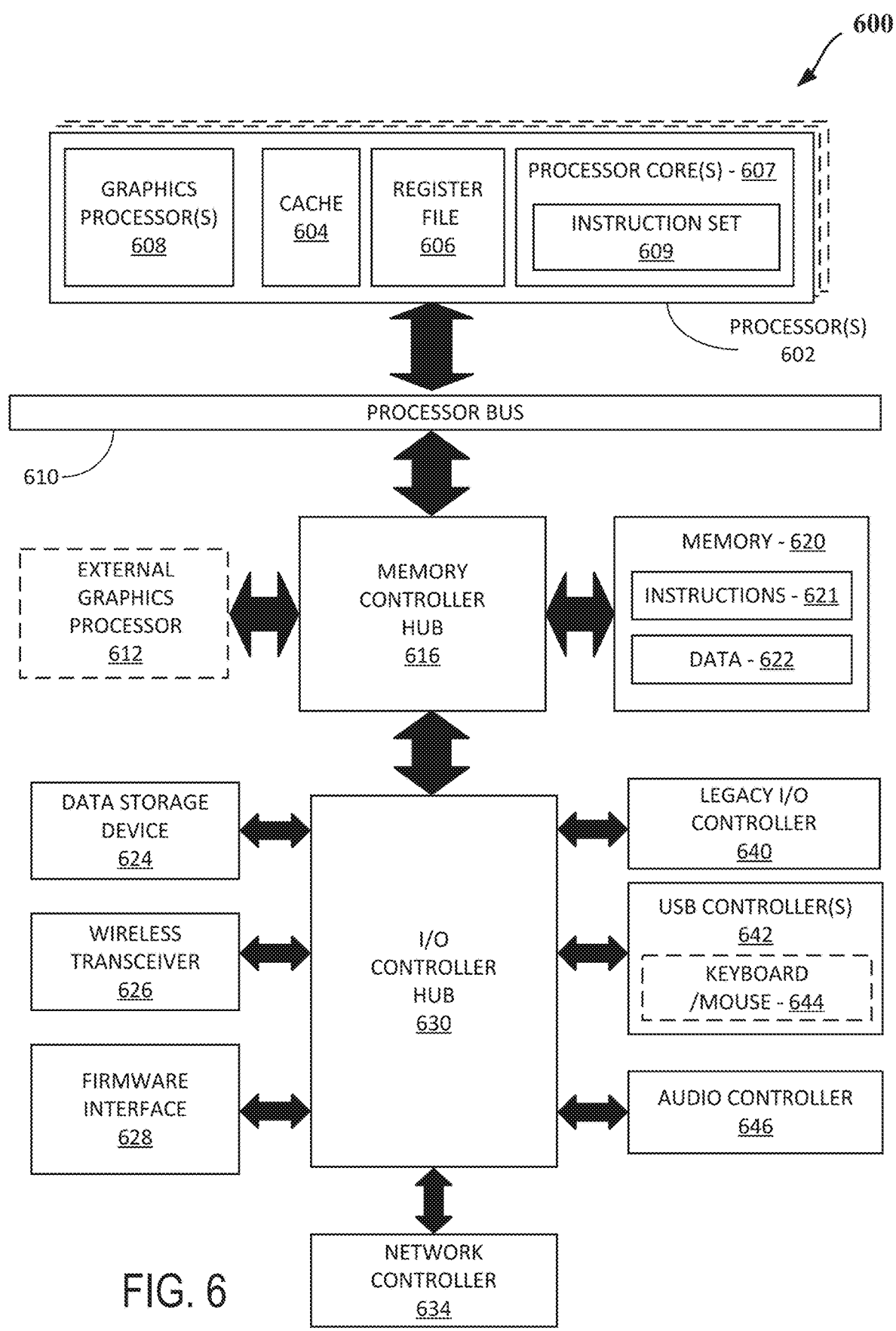
FIG. 6 is a block diagram of a processing system according to an embodiment.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 702 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary "hub" system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random-access memory (DRAM) device, a static random-access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
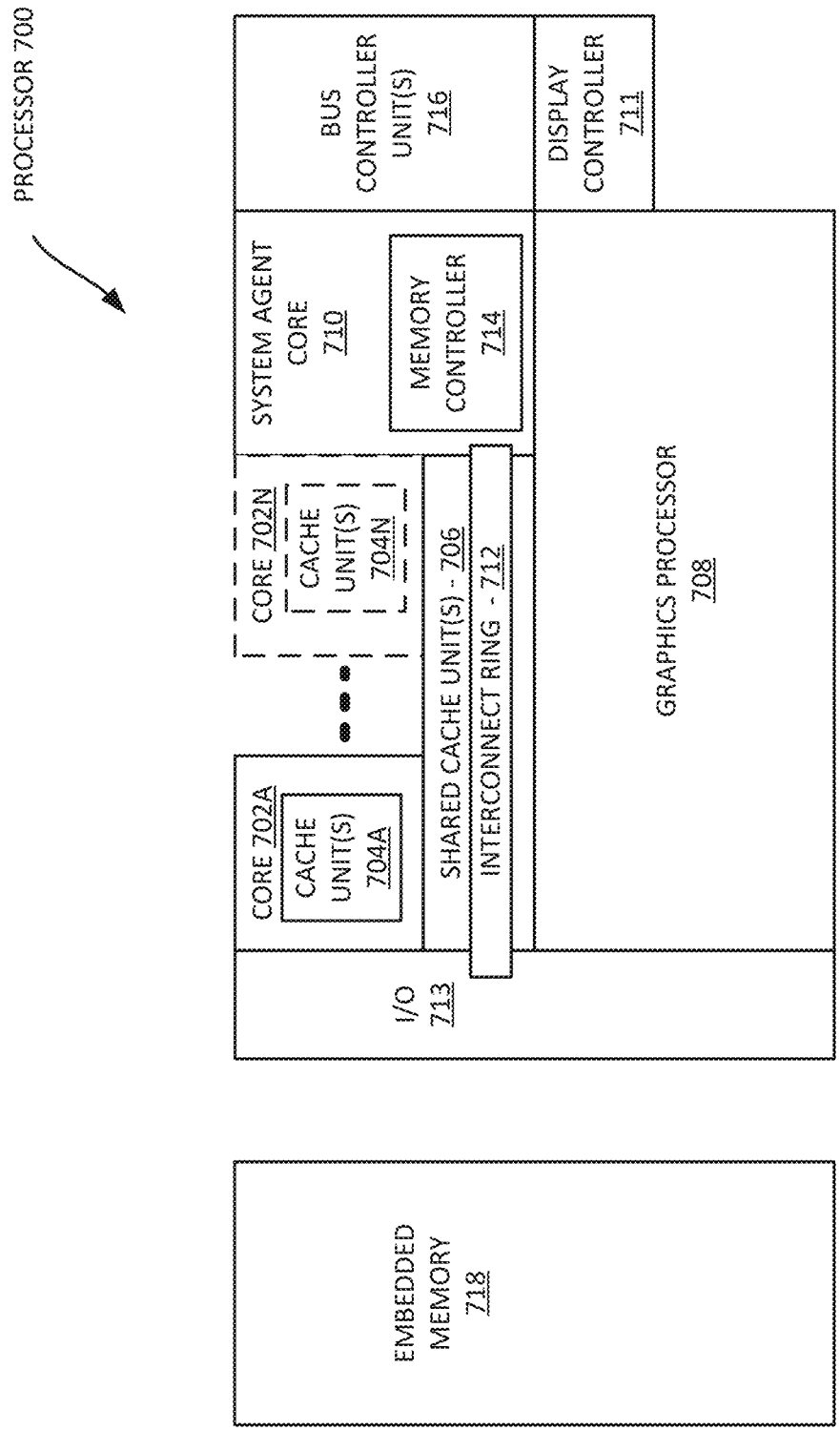
FIG. 7 is a block diagram of a processor having one or more processor cores, an integrated memory controller, and an integrated graphics processor in accordance with one or more embodiments.

FIG. 7 is a block diagram of an embodiment of a processor 700 having one or more processor cores 702A to 702N, an integrated memory controller 714, and an integrated graphics processor 708. Those elements of FIG. 7 having the same reference numbers (or names) as the elements of any other figure herein can operate or function in any manner similar to that described elsewhere herein but are not limited to such. Processor 700 can include additional cores up to and including additional core 702N represented by the dashed lined boxes. Each of processor cores 702A to 702N includes one or more internal cache units 704A to 704N. In some embodiments each processor core also has access to one or more shared cached units 706.

The internal cache units 704A to 704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A to 704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A to 702N include support for simultaneous multi-threading. In such embodiment, the system agent core 710 includes components for coordinating and operating cores 702A to 702N during multi-threaded processing. System agent core 710 may additionally include a power control unit (PCU), which includes logic and components to regulate the power state of processor cores 702A to 702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702 to 702N and graphics processor 808 use embedded memory modules 718 as a shared Last Level Cache.

In some embodiments, processor cores 702A to 702N are homogenous cores executing the same instruction set architecture. In another embodiment, processor cores 702A to 702N are heterogeneous in terms of instruction set architecture (ISA), where one or more of processor cores 702A to 702N execute a first instruction set, while at least one of the other cores executes a subset of the first instruction set or a different instruction set. In one embodiment processor cores 702A to 702N are heterogeneous in terms of microarchitecture, where one or more cores having a relatively higher power consumption couple with one or more power cores having a lower power consumption. Additionally, processor 700 can be implemented on one or more chips or as an SoC integrated circuit having the illustrated components, in addition to other components.

Figure 8:
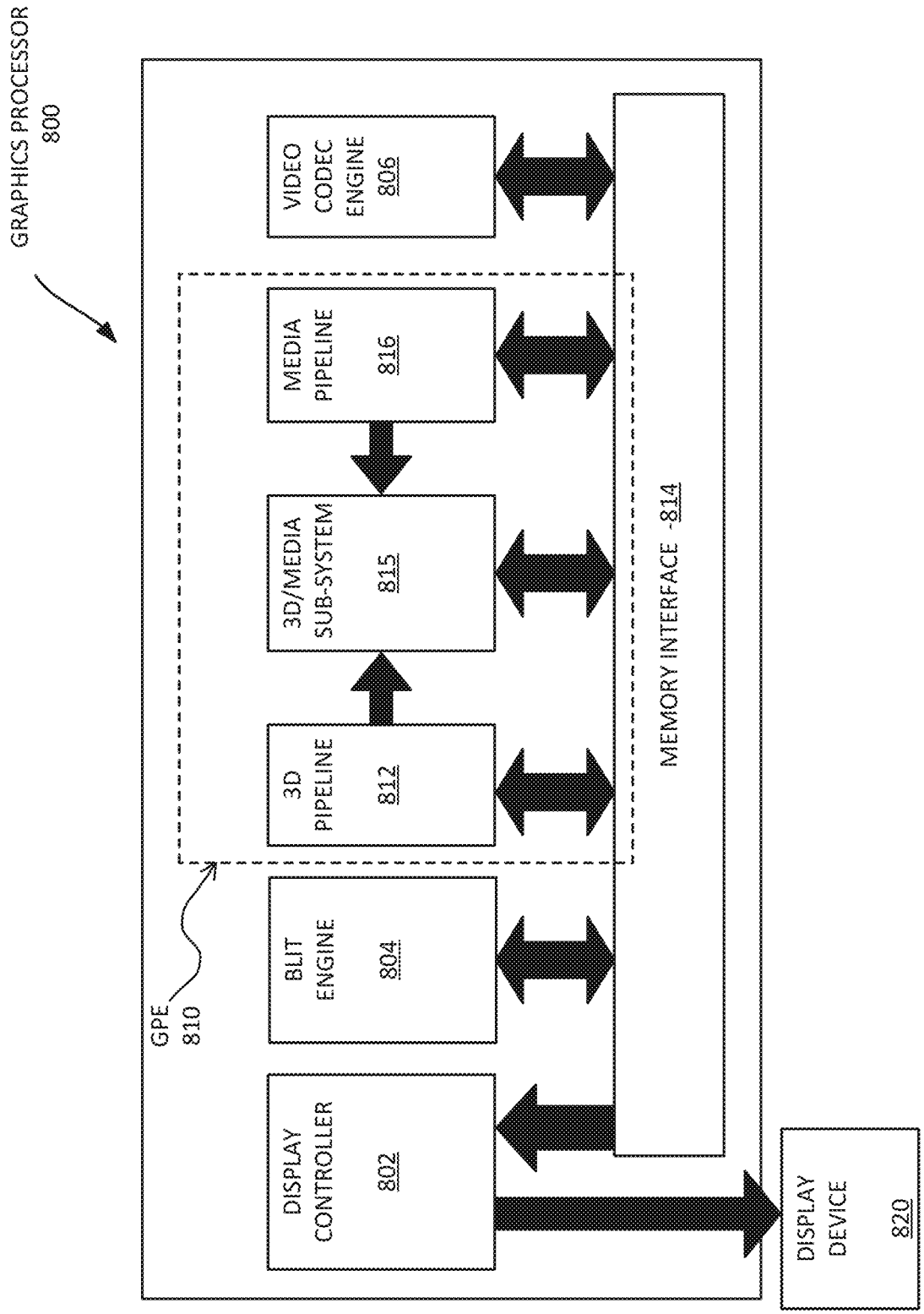
FIG. 8 is a block diagram of a graphics processor, which may be a discrete graphics processing unit, or may be a graphics processor integrated with a plurality of processing cores in accordance with one or more embodiments.

FIG. 8 is a block diagram of a graphics processor 800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 800 includes a memory interface 814 to access memory. Memory interface 814 can be an interface to local memory, one or more internal caches, one or more shared external caches, and/or to system memory.

In some embodiments, graphics processor 800 also includes a display controller 802 to drive display output data to a display device 820. Display controller 802 includes hardware for one or more overlay planes for the display and composition of multiple layers of video or user interface elements. In some embodiments, graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 800 includes a block image transfer (BLIT) engine 804 to perform two-dimensional (2D) rasterizer operations including, for example, bit-boundary block transfers. However, in one embodiment, 2D graphics operations are performed using one or more components of graphics processing engine (GPE) 810. In some embodiments, graphics processing engine 810 is a compute engine for performing graphics operations, including three-dimensional (3D) graphics operations and media operations.

In some embodiments, GPE 810 includes a 3D pipeline 812 for performing 3D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While 3D pipeline 812 can be used to perform media operations, an embodiment of GPE 810 also includes a media pipeline 816 that is specifically used to perform media operations, such as video post-processing and image enhancement.

In some embodiments, media pipeline 816 includes fixed function or programmable logic units to perform one or more specialized media operations, such as video decode acceleration, video de-interlacing, and video encode acceleration in place of, or on behalf of video codec engine 806. In some embodiments, media pipeline 816 additionally includes a thread spawning unit to spawn threads for execution on 3D/Media sub-system 815. The spawned threads perform computations for the media operations on one or more graphics execution units included in 3D/Media subsystem 815.

In some embodiments, 3D/Media subsystem 815 includes logic for executing threads spawned by 3D pipeline 812 and media pipeline 816. In one embodiment, the pipelines send thread execution requests to 3D/Media subsystem 815, which includes thread dispatch logic for arbitrating and dispatching the various requests to available thread execution resources. The execution resources include an array of graphics execution units to process the 3D and media threads. In some embodiments, 3D/Media subsystem 815 includes one or more internal caches for thread instructions and data. In some embodiments, the subsystem also includes shared memory, including registers and addressable memory, to share data between threads and to store output data.

Figure 9:
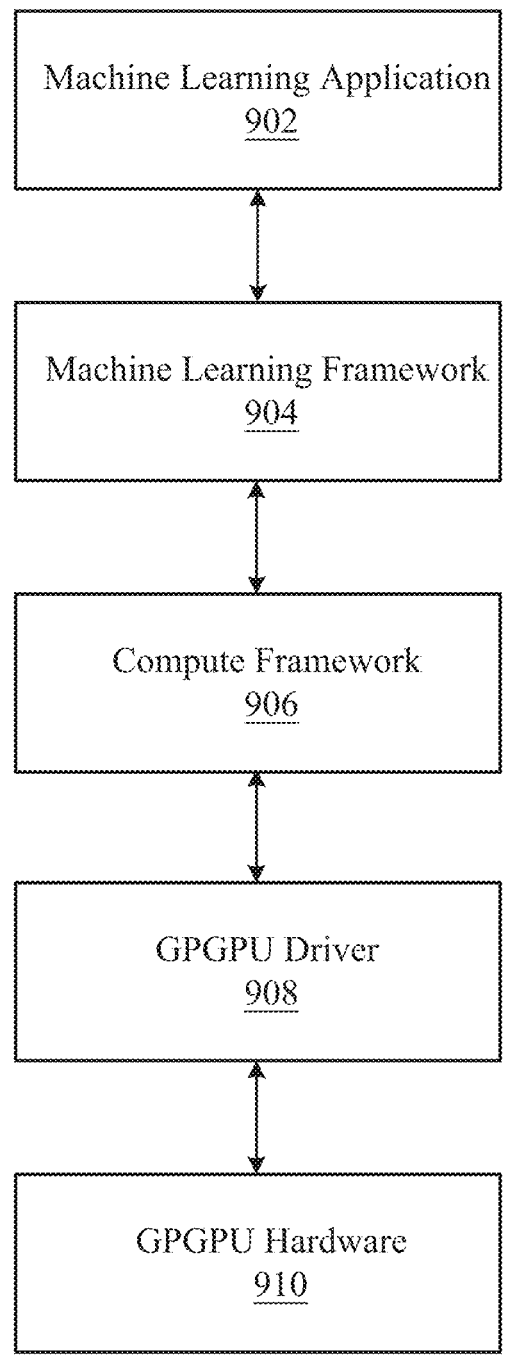
FIG. 9 is a generalized diagram of a machine learning software stack in accordance with one or more embodiments.

FIG. 9 is a generalized diagram of a machine learning software stack 900. A machine learning application 1102 can be configured to train a neural network using a training dataset or to use a trained deep neural network to implement machine intelligence. The machine learning application 902 can include training and inference functionality for a neural network and/or specialized software that can be used to train a neural network before deployment. The machine learning application 902 can implement any type of machine intelligence including but not limited to image recognition, mapping and localization, autonomous navigation, speech synthesis, medical imaging, or language translation.

Hardware acceleration for the machine learning application 902 can be enabled via a machine learning framework 904. The machine learning framework 904 can provide a library of machine learning primitives. Machine learning primitives are basic operations that are commonly performed by machine learning algorithms. Without the machine learning framework 904, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 904. Exemplary primitives include tensor convolutions, activation functions, and pooling, which are computational operations that are performed while training a convolutional neural network (CNN). The machine learning framework 904 can also provide primitives to implement basic linear algebra subprograms performed by many machine-learning algorithms, such as matrix and vector operations.

The machine learning framework 904 can process input data received from the machine learning application 902 and generate the appropriate input to a compute framework 906. The compute framework 906 can abstract the underlying instructions provided to the GPGPU driver 908 to enable the machine learning framework 904 to take advantage of hardware acceleration via the GPGPU hardware 910 without requiring the machine learning framework 904 to have intimate knowledge of the architecture of the GPGPU hardware 910. Additionally, the compute framework 1106 can enable hardware acceleration for the machine learning framework 904 across a variety of types and generations of the GPGPU hardware 910.

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 10:
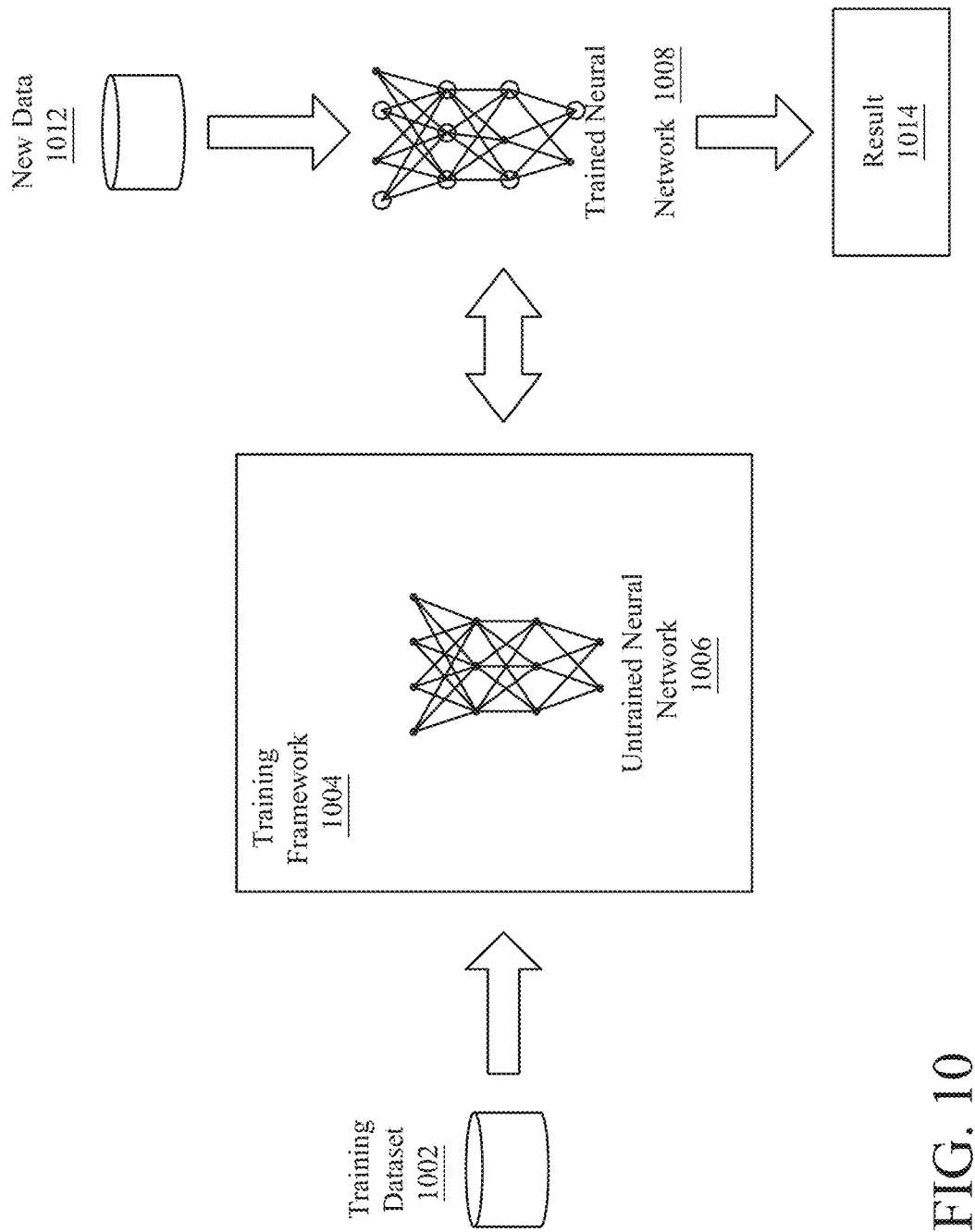
FIG. 10 illustrates training and deployment of a deep neural network in accordance with one or more embodiments.

FIG. 10 illustrates training and deployment of a deep neural network. Once a given network has been structured for a task the neural network is trained using a training dataset 1002. Various training frameworks have been developed to enable hardware acceleration of the training process. For example, the machine learning framework 904 of FIG. 9 may be configured as a training framework 1004. The training framework 1004 can hook into an untrained neural network 1006 and enable the untrained neural net to be trained using the parallel processing resources described herein to generate a trained neural network 1008. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1002 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1004 can adjust to adjust the weights that control the untrained neural network 1006. The training framework 1004 can provide tools to monitor how well the untrained neural network 1006 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1208. The trained neural network 1008 can then be deployed to implement any number of machine learning operations.

Unsupervised learning is a learning method in which the network attempts to train itself using unlabeled data. Thus, for unsupervised learning the training dataset 1002 will include input data without any associated output data. The untrained neural network 1006 can learn groupings within the unlabeled input and can determine how individual inputs are related to the overall dataset. Unsupervised training can be used to generate a self-organizing map, which is a type of trained neural network 1007 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1002 includes a mix of labeled and unlabeled data of the same distribution. Incremental learning is a variant of supervised learning in which input data is continuously used to further train the model. Incremental learning enables the trained neural network 1008 to adapt to the new data 1012 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

The following examples pertain to further embodiments. In example one, an apparatus to generate a user-defined crosswalk comprises a processor to receive an input from a user to request a crosswalk across a roadway at a selected location, and a memory coupled to the processor to store information regarding the crosswalk, wherein the processor is to transmit the request to one or more vehicles using the roadway, and to receive a response indicating whether the crosswalk request is accepted such that the one or more vehicles are to stop to allow the user to cross the roadway using the crosswalk at the selected location in the event the crosswalk request is accepted. Example two may include the subject matter of example one or any of the examples described herein, wherein the response indicates that the crosswalk request is rejected. Example three 3 may include the subject matter of example one or any of the examples described herein, wherein the response indicates that the crosswalk is rejected, and includes a recommendation for the crosswalk at an alternate location. Example four may include the subject matter of example one or any of the examples described herein, wherein the processor is to transmit an acceptance or rejection of the recommendation, and wherein the one or more vehicles are to stop to allow the user to cross the roadway using the crosswalk at the alternate location in the event the recommendation is accepted. Example five may include the subject matter of example one or any of the examples described herein, wherein the response includes at time at which the crosswalk is to be available. Example six may include the subject matter of example one or any of the examples described herein, wherein the request is to be transmitted to a server in communication with the one or more vehicles. Example seven may include the subject matter of example one or any of the examples described herein, wherein the request is directly transmitted to the one or more vehicles via a wireless wide area network (WWAN), a network operating in compliance with a Third Generation Partnership Project (3GPP) standard, a wireless local area network (WLAN), a network operating in accordance with an Institute of Electrical and Electronics Engineers (IEEE) 802.11 standard, a mesh network, a PC5 link, or a combination thereof.

In example eight, a self-driving vehicle to respond to a user-defined crosswalk comprises a processor to receive a request for a crosswalk across a roadway for a user at a first location, and a memory coupled to the processor to store information regarding the crosswalk, wherein the processor is to transmit a response to the request indicating whether the crosswalk request is accepted such that the self-driving vehicle is to stop to allow the user to cross the roadway using the crosswalk at the first location in the event the crosswalk request is accepted. Example nine may include the subject matter of example eight or any of the examples described herein, wherein the response indicates that the crosswalk request is rejected. Example ten may include the subject matter of example eight or any of the examples described herein, wherein the response indicates that the crosswalk is rejected, and includes a recommendation for the crosswalk at a second location. Example eleven may include the subject matter of example eight or any of the examples described herein, wherein the processor is to receive an acceptance or rejection of the recommendation, and wherein the self-driving vehicle is to stop to allow the user to cross the roadway using the crosswalk at the second location in the event the recommendation is accepted. Example twelve may include the subject matter of example eight or any of the examples described herein, wherein the response includes at time at which the crosswalk is to be available. Example thirteen may include the subject matter of example eight or any of the examples described herein, wherein the request received from a server in communication with the self-driving vehicle. Example fourteen may include the subject matter of example eight or any of the examples described herein, wherein the request is directly transmitted to the self-driving vehicle via a wireless wide area network (WWAN), a network operating in compliance with a Third Generation Partnership Project (3GPP) standard, a wireless local area network (WLAN), a network operating in accordance with an Institute of Electrical and Electronics Engineers (IEEE) 802.11 standard, a mesh network, a PC5 link, or a combination thereof.

In example fifteen, a system to manage a user-defined crosswalk comprises a processor to receive a request for a crosswalk across a roadway for a user at a first location, and a memory coupled to the processor to store information regarding the crosswalk, wherein the processor is to transmit a response to the request indicating whether the crosswalk request is accepted, and to transmit a command to one or more vehicles in the roadway to stop to allow the user to cross the roadway using the crosswalk at the first location in the event the crosswalk request is accepted. Example sixteen may include the subject matter of example fifteen or any of the examples described herein, wherein the response indicates that the crosswalk request is rejected. Example seventeen may include the subject matter of example fifteen or any of the examples described herein, wherein the response indicates that the crosswalk is rejected, and includes a recommendation for the crosswalk at a second location. Example eighteen may include the subject matter of example fifteen or any of the examples described herein, wherein the processor is to receive an acceptance or rejection of the recommendation, and wherein the one or more vehicles are to stop to allow the user to cross the roadway using the crosswalk at the second location in the event the recommendation is accepted. Example nineteen may include the subject matter of example fifteen or any of the examples described herein, wherein the response includes at time at which the crosswalk is to be available. Example twenty may include the subject matter of example fifteen or any of the examples described herein, wherein the request is received from a device of the user. Example twenty-one may include the subject matter of example fifteen or any of the examples described herein, wherein the request is received from a device in an environment of the roadway, wherein the device includes a camera, microphone, or sensor, or a combination thereof.

In example twenty-two, one or more non-transitory machine-readable media have instructions thereon that, when executed, result in receiving an input from a user to request a crosswalk across a roadway at a selected location, transmitting the request to one or more vehicles using the roadway, and receiving a response indicating whether the crosswalk request is accepted such that the one or more vehicles are to stop to allow the user to cross the roadway using the crosswalk at the selected location in the event the crosswalk request is accepted. Example twenty-three may include the subject matter of example twenty-two or any of the examples described herein, wherein the response indicates that the crosswalk request is rejected. Example twenty-four may include the subject matter of example twenty-two or any of the examples described herein, wherein the response indicates that the crosswalk is rejected, and includes a recommendation for the crosswalk at an alternate location. Example twenty-five may include the subject matter of example twenty-two or any of the examples described herein, when executed, further result in transmitting an acceptance or rejection of the recommendation, and wherein the one or more vehicles are to stop to allow the user to cross the roadway using the crosswalk at the alternate location in the event the recommendation is accepted. Example twenty-six may include the subject matter of example twenty-two or any of the examples described herein, wherein the response includes at time at which the crosswalk is to be available. Example twenty-seven may include the subject matter of example twenty-two or any of the examples described herein, wherein the request is to be transmitted to a server in communication with the one or more vehicles. Example twenty-eight may include the subject matter of example twenty-two or any of the examples described herein, wherein the request is directly transmitted to the one or more vehicles via a wireless wide area network (WWAN), a network operating in compliance with a Third Generation Partnership Project (3GPP) standard, a wireless local area network (WLAN), a network operating in accordance with an Institute of Electrical and Electronics Engineers (IEEE) 802.11 standard, a mesh network, a PC5 link, or a combination thereof.

In various embodiments, the operations discussed herein, e.g., with reference to the figures described herein, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to the present figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus to generate a user-defined crosswalk, comprising:
a processor to receive an input from a user to request a crosswalk across a roadway at a selected location, wherein the user input is received as an input by the user on a map displayed by a mapping application to indicate the selected location of the requested crosswalk on the map; and
a memory coupled to the processor to store information regarding the crosswalk;
wherein the processor is to transmit the request to one or more vehicles using the roadway, and to receive a response indicating whether the crosswalk request is accepted such that the one or more vehicles are to stop to allow the user to cross the roadway using the crosswalk at the selected location in the event the crosswalk request is accepted.

2. The apparatus of claim 1, wherein the response indicates that the crosswalk request is rejected.

3. The apparatus of claim 1, wherein the response indicates that the crosswalk is rejected, and includes a recommendation for the crosswalk at an alternate location.

4. The apparatus of claim 3, wherein the processor is to transmit an acceptance or rejection of the recommendation, and wherein the one or more vehicles are to stop to allow the user to cross the roadway using the crosswalk at the alternate location in the event the recommendation is accepted.

5. The apparatus of claim 1, wherein the response includes a time at which the crosswalk is to be available.

6. The apparatus of claim 1, wherein the request is to be transmitted to a server in communication with the one or more vehicles.

7. The apparatus of claim 1, wherein the request is directly transmitted to the one or more vehicles via a wireless wide area network (WWAN), a network operating in compliance with a Third Generation Partnership Project (3GPP) standard, a wireless local area network (WLAN), a network operating in accordance with an Institute of Electrical and Electronics Engineers (IEEE) 802.11 standard, a mesh network, a PC5 link, or a combination thereof.

8. One or more non-transitory machine-readable media having instructions thereon that, when executed, result in:
displaying a map using a mapping application;
receiving an input from a user to request a crosswalk across a roadway at a selected location, wherein the user input is received as an input by the user on the displayed map to indicate the selected location of the requested crosswalk on the map;
transmitting the request to one or more vehicles using the roadway; and
receiving a response indicating whether the crosswalk request is accepted such that the one or more vehicles are to stop to allow the user to cross the roadway using the crosswalk at the selected location in the event the crosswalk request is accepted.

9. The one or more non-transitory machine-readable media of claim 8, wherein the response indicates that the crosswalk request is rejected.

10. The one or more non-transitory machine-readable media of claim 8, wherein the response indicates that the crosswalk is rejected, and includes a recommendation for the crosswalk at an alternate location.

11. The one or more non-transitory machine-readable media of claim 10, wherein the instructions, when executed, further result in transmitting an acceptance or rejection of the recommendation, and wherein the one or more vehicles are to stop to allow the user to cross the roadway using the crosswalk at the alternate location in the event the recommendation is accepted.

12. The one or more non-transitory machine-readable media of claim 8, wherein the response includes a time at which the crosswalk is to be available.

13. The one or more non-transitory machine-readable media of claim 8, wherein the request is to be transmitted to a server in communication with the one or more vehicles.

14. The one or more non-transitory machine-readable media of claim 8, wherein the request is directly transmitted to the one or more vehicles via a wireless wide area network (WWAN), a network operating in compliance with a Third Generation Partnership Project (3GPP) standard, a wireless local area network (WLAN), a network operating in accordance with an Institute of Electrical and Electronics Engineers (IEEE) 802.11 standard, a mesh network, a PC5 link, or a combination thereof.

* * * * *